US012597431B1

(12) United States Patent
Mansour

(10) Patent No.: US 12,597,431 B1
(45) Date of Patent: Apr. 7, 2026

(54) NOISE SUPPRESSION USING SUBSPACE PROCESSING

(71) Applicant: Amazon Technologies, Inc., Seattle, WA (US)

(72) Inventor: Mohamed Mansour, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 283 days.

(21) Appl. No.: 18/185,881

(22) Filed: Mar. 17, 2023

(51) Int. Cl.
*G10L 21/0216* (2013.01)
*G10L 25/60* (2013.01)
*G10L 25/78* (2013.01)

(52) U.S. Cl.
CPC .......... *G10L 21/0216* (2013.01); *G10L 25/60* (2013.01); *G10L 25/78* (2013.01); *G10L 2021/02166* (2013.01)

(58) Field of Classification Search
CPC ..... G10L 21/0216; G10L 25/60; G10L 25/78; G10L 2021/02166
See application file for complete search history.

(56) References Cited

U.S. PATENT DOCUMENTS 9,008,329 B1 * 4/2015 Mandel .................. G10K 15/00 704/226

FOREIGN PATENT DOCUMENTS

WO WO-0014725 A1 * 3/2000 ......... G10L 21/0208

* cited by examiner

*Primary Examiner* — Daniel C Washburn
*Assistant Examiner* — Penny L Caudle
(74) *Attorney, Agent, or Firm* — Pierce Atwood LLP

(57) ABSTRACT

A system configured to perform noise suppression using subspace processing. For example, a device may estimate a multichannel noise subspace and use the estimated noise subspace to perform noise suppression while preserving coherence between microphones, enabling further processing (e.g., beamforming, SSL processing). The device may estimate the noise subspace during non-speech activity to determine a set of principal noise components in each frequency band. In some examples, the device may perform time-varying principal component analysis (PCA) processing to adaptively estimate the noise subspace. For example, the device may determine a noise matrix, estimate the noise subspace using dominant eigenvectors of the noise matrix, project the input noisy observations onto the null space of noise to determine a noise estimate and perform noise suppression. To reduce signal distortion, the device may use a signal quality metric as a proxy for speech detection and vary an amount of noise suppression accordingly.

19 Claims, 4 Drawing Sheets

FIG. 3

Equations
300

Multichannel
Microphone Signal
310

$$\mathbf{y}(\omega,t) = \mathbf{s}(\omega,t) + \mathbf{v}(\omega,t)$$

Scaling Factor
315

$$\eta(\omega,t) = \frac{\eta_o}{1+\exp\left(\delta\ (\gamma(t)-\gamma_o)\right)}$$

Noise Matrix
320

$$\mathbf{B}^{(t)}(\omega) = \nu\ \mathbf{B}^{(t-1)}(\omega) + \eta(\omega,t)\ \ \mathbf{v}(\omega,t)\ .\ \mathbf{v}'(\omega,t)$$

Projection Matrix
325

$$\mathbf{P}(\omega) = (\mathbf{u}_1(\omega)\ \mathbf{u}_2(\omega)\ \ldots\ \mathbf{u}_m(\omega))\ \ (\mathbf{u}_1(\omega)\ \mathbf{u}_2(\omega)\ \ldots\ \mathbf{u}_m(\omega))'$$

Noise Estimate
330

$$\begin{aligned}\tilde{\mathbf{v}}(\omega,t) &= \mathbf{P}(\omega)\ \mathbf{y}(\omega,t)\\ &= \sum_{l=1}^{m}\langle\ \mathbf{u}_l(\omega),\mathbf{y}(\omega,t)\ \rangle\ \mathbf{u}_l(\omega)\end{aligned}$$

Weighted Noise
Estimate
335

$$\mathbf{z}(\omega,t) = \sum_{l=0}^{T}\tilde{\mathbf{v}}(\omega,t-l)\odot\mathbf{h}^*(\omega,l)$$

Estimated Noise Floor
340

$$\rho(\omega,t) = \tau\ \rho(\omega,t-1) + (1-\tau)\,\tilde{\mathbf{v}}(\omega,t)$$

Weighting Factor
345

$$\beta(\omega,t) = \min\left(\frac{\beta_o}{1+\exp\left(\delta\ \ (\gamma(t)-\bar{\gamma})\right)}\ ,\ \lambda\ \frac{\|\rho(\omega,t-1)\|}{\|\tilde{\mathbf{v}}(\omega,t)\|}\right)$$

Enhanced Signal
350

$$\tilde{\mathbf{s}}(\omega,t) = \mathbf{y}(\omega,t) - \beta(\omega,t)\,\mathbf{z}(\omega,t)$$

NOISE SUPPRESSION USING SUBSPACE PROCESSING

BACKGROUND

With the advancement of technology, the use and popularity of electronic devices has increased considerably. Electronic devices are commonly used to receive input audio and generate audio data. Described herein are technological improvements to such systems.

BRIEF DESCRIPTION OF DRAWINGS

For a more complete understanding of the present disclosure, reference is now made to the following description taken in conjunction with the accompanying drawings.

FIG. 3 illustrates example equations to perform noise suppression using subspace processing according to embodiments of the present disclosure.

DETAILED DESCRIPTION

Electronic devices may be used to capture audio and process audio data. The audio data may be used for voice commands and/or sent to a remote device as part of a communication session. To process voice commands from a particular user or to send audio data that only corresponds to the particular user, the device may attempt to isolate desired speech associated with the user from undesired speech associated with other users and/or other sources of noise, such as audio generated by loudspeaker(s) or ambient noise in an environment around the device. For example, the device may perform echo cancellation, beamforming, sound source localization (SSL) and/or additional processing to remove noise and isolate audio data representing the desired speech.

To preprocess multichannel microphone data and/or isolate a target signal, devices, systems and methods are disclosed that perform noise suppression using subspace processing. For example, a device may estimate a multichannel noise subspace and use the estimated noise subspace to perform noise suppression while preserving coherence between microphones that is needed in further processing (e.g., beamforming, SSL processing, etc.). The device may estimate the noise subspace during non-speech activity to determine a set of principal noise components in each frequency band. In some examples, the device may perform time-varying principal component analysis (PCA) processing to adaptively estimate the noise subspace. For example, the device may determine a noise matrix, estimate the noise subspace using dominant eigenvectors of the noise matrix, project the input noisy observations onto the null space of noise to determine a noise estimate, and perform noise suppression using the noise estimate.

To reduce signal distortion, the device may use a signal quality metric as a proxy for speech detection and vary an amount of noise suppression accordingly. For example, the device may determine a signal-to-noise ratio (SNR) value and control the amount of noise suppression so that it is inversely proportional to the SNR value, with low SNR corresponding to aggressive noise suppression. Additionally or alternatively, the device may include a voice activity detector (VAD) and only update the noise matrix during non-speech activity.

Figure 1:
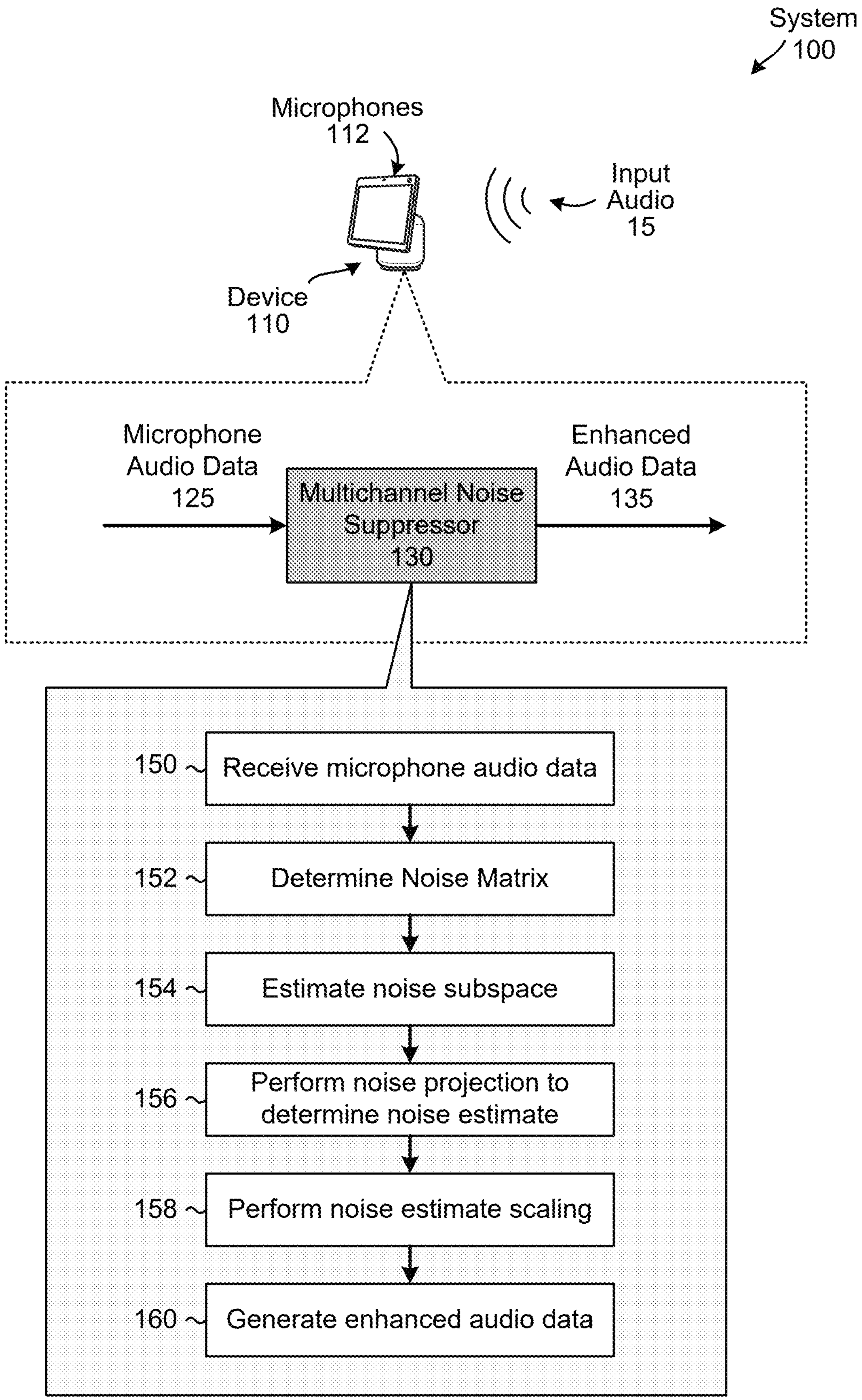
FIG. 1 illustrates a system for performing noise suppression using subspace processing according to embodiments of the present disclosure.

FIG. 1 illustrates a system for performing noise suppression using subspace processing according to embodiments of the present disclosure. For example, a system 100 may include a device 110 (e.g., electronic device) having microphones 112 configured to capture input audio 15 and generate microphone audio data 125. While FIG. 1 illustrates the device 110 being a speech-controlled device, the disclosure is not limited thereto and the system 100 may include any device having microphones 112. Although FIG. 1, and other figures/discussion illustrate the operation of the system in a particular order, the steps described may be performed in a different order (as well as certain steps removed or added) without departing from the intent of the disclosure. Additionally or alternatively, the components of the device 110 may be included in a different order without departing from the disclosure.

The device 110 may be configured to generate the microphone audio data 125 based on input audio 15 present in the environment, which the device 110 may capture using the microphones 112. The input audio 15 may correspond to speech (e.g., a voice command or utterance) generated by a user, audible sounds (e.g., music, mechanical sounds, ambient noise, etc.), and/or the like. Thus, the microphone audio data 125 may include a digital or analog representation of voice, music, silence, sound effects, and/or any other sounds associated with the input audio 15. The microphone audio data 125 may be time-domain audio data or frequency-domain audio data without departing from the disclosure. For example, time-domain audio data may represent an amplitude of audio over time, whereas frequency-domain audio data may represent an amplitude of audio over frequency.

As illustrated in FIG. 1, the device 110 may generate enhanced audio data 135 using a multichannel noise suppressor component 130. For example, the multichannel noise suppressor component 130 may be configured to perform noise suppression processing to the microphone audio data 125 to generate the enhanced audio data 135, which isolates a target signal. In some examples, such as when the input audio 15 includes speech, the target signal may correspond to the speech. For example, the device 110 may perform noise suppression to generate enhanced audio data 135 that corresponds to an enhanced speech signal that isolates the speech. In some examples, the device 110 may cause language processing to be performed on the enhanced audio data 135 to determine a voice command and/or may cause an action to be performed that is responsive to the voice command. However, the disclosure is not limited thereto, and the target signal may correspond to any audible sound represented in the microphone audio data 125 without departing from the disclosure.

In some examples, the device 110 may estimate a multichannel noise subspace and use the estimated noise subspace to perform noise suppression while preserving coherence between microphones 112 that is needed in subsequent processing (e.g., beamforming, SSL processing, etc.). For example, the multichannel noise suppressor component 130 may perform noise suppression to generate the enhanced audio data 135 prior to a beamformer component performing beamforming, an acoustic echo cancellation (AEC) component performing echo cancellation, an SSL component performing SSL processing, and/or the like, although the disclosure is not limited thereto.

The device 110 may estimate the noise subspace during non-speech activity to determine a set of principal noise components in each frequency band. In some examples, the device 110 may perform time-varying principal component analysis (PCA) processing to adaptively estimate the noise subspace. For example, the device 110 may perform PCA processing on an extended vector corresponding to multiple microphones in the microphone array, although the disclosure is not limited thereto. Then the device 110 may project the input noisy observation onto the null subspace to recover the target signal. For example, the device 110 may determine a noise matrix, estimate the noise subspace using dominant eigenvectors of the noise matrix, project the input noisy observations onto the null space of noise to determine a noise estimate, and perform noise suppression using the noise estimate. Thus, the device 110 may generate the enhanced audio data 135 by subtracting the noise estimate from the microphone audio data 125.

In some examples, the device 110 may reduce signal distortion by using a signal quality metric as a proxy for speech detection and varying an amount of noise suppression accordingly. For example, the device may determine a signal-to-noise ratio (SNR) value and control the amount of noise suppression so that it is inversely proportional to the SNR value, with low SNR corresponding to aggressive noise suppression. Additionally or alternatively, the device 110 may include a voice activity detector (VAD) and only update the noise matrix during non-speech activity.

As illustrated in FIG. 1, the multichannel noise suppressor component 130 may generate the enhanced audio data 135 using steps 150-160, which will be described in greater detail below with regard to FIG. 2 and Equations [1]-[16]. For example, the multichannel noise suppressor component 130 may receive (150) microphone audio data 125 and determine (152) a noise matrix using the microphone audio data 125. Based on the noise matrix, the multichannel noise suppressor component 130 may estimate (154) a noise subspace and perform (156) noise projection to determine a noise estimate. For example, the noise subspace may correspond to dominant eigenvectors that are determined by performing eigenvalue decomposition (e.g., eigendecomposition) using the noise matrix.

Performing noise suppression involves a compromise between noise reduction and signal distortion. For example, at low signal-to-noise ratio (SNR) values, noise suppression enhancement outweighs degradation due to signal distortion and vice versa. Thus, an intuitive trade-off is for the device 110 to apply noise suppression aggressively at low SNR values (e.g., low signal quality metric values), while gradually reducing an amount of noise suppression as SNR values increase (e.g., high signal quality metric values). In some examples, the multichannel noise suppressor component 130 may control an amount of noise suppression based on these signal quality metrics. For example, the multichannel noise suppressor component 130 may perform (158) noise estimate scaling and generate a scaled noise estimate based on the SNR values. Finally, the multichannel noise suppressor component 130 may generate (160) enhanced audio data by subtracting the scaled noise estimate from the microphone audio data.

While FIG. 1 illustrates an example in which the device 110 performs noise suppression processing on the microphone audio data 125 (e.g., collectively processing microphone signals from multiple microphones), the disclosure is not limited thereto. Instead, the device 110 may perform noise suppression processing on beamformed audio data (e.g., collectively processing beamformed signals corresponding to multiple directions) generated by a beamformer component without departing from the disclosure. For example, the device 110 may process each individual beamformed signal using the noise suppression processing described below for an individual microphone signal. Additionally or alternatively, while the examples described below refer to performing noise suppression using principal component analysis (PCA) to approximate a target subspace (e.g., noise subspace), the disclosure is not limited thereto. Instead, the device 110 may perform subspace processing using other techniques that approximate a target subspace without departing from the disclosure.

An audio signal is a representation of sound and an electronic representation of an audio signal may be referred to as audio data, which may be analog and/or digital without departing from the disclosure. For ease of illustration, the disclosure may refer to either audio data (e.g., reference audio data or playback audio data, microphone audio data or input audio data, etc.) or audio signals (e.g., playback signals, microphone signals, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), noise reduction (NR) processing, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

A gain value is an amount of gain (e.g., amplification or attenuation) to apply to the input energy level to generate an output energy level. For example, the device 110 may apply the gain value to the input audio data to generate output audio data. A positive dB gain value corresponds to amplification (e.g., increasing a power or amplitude of the output audio data relative to the input audio data), whereas a negative dB gain value corresponds to attenuation (decreasing a power or amplitude of the output audio data relative to the input audio data). For example, a gain value of 6 dB corresponds to the output energy level being twice as large as the input energy level, whereas a gain value of −6 dB corresponds to the output energy level being half as large as the input energy level.

Figure 2:
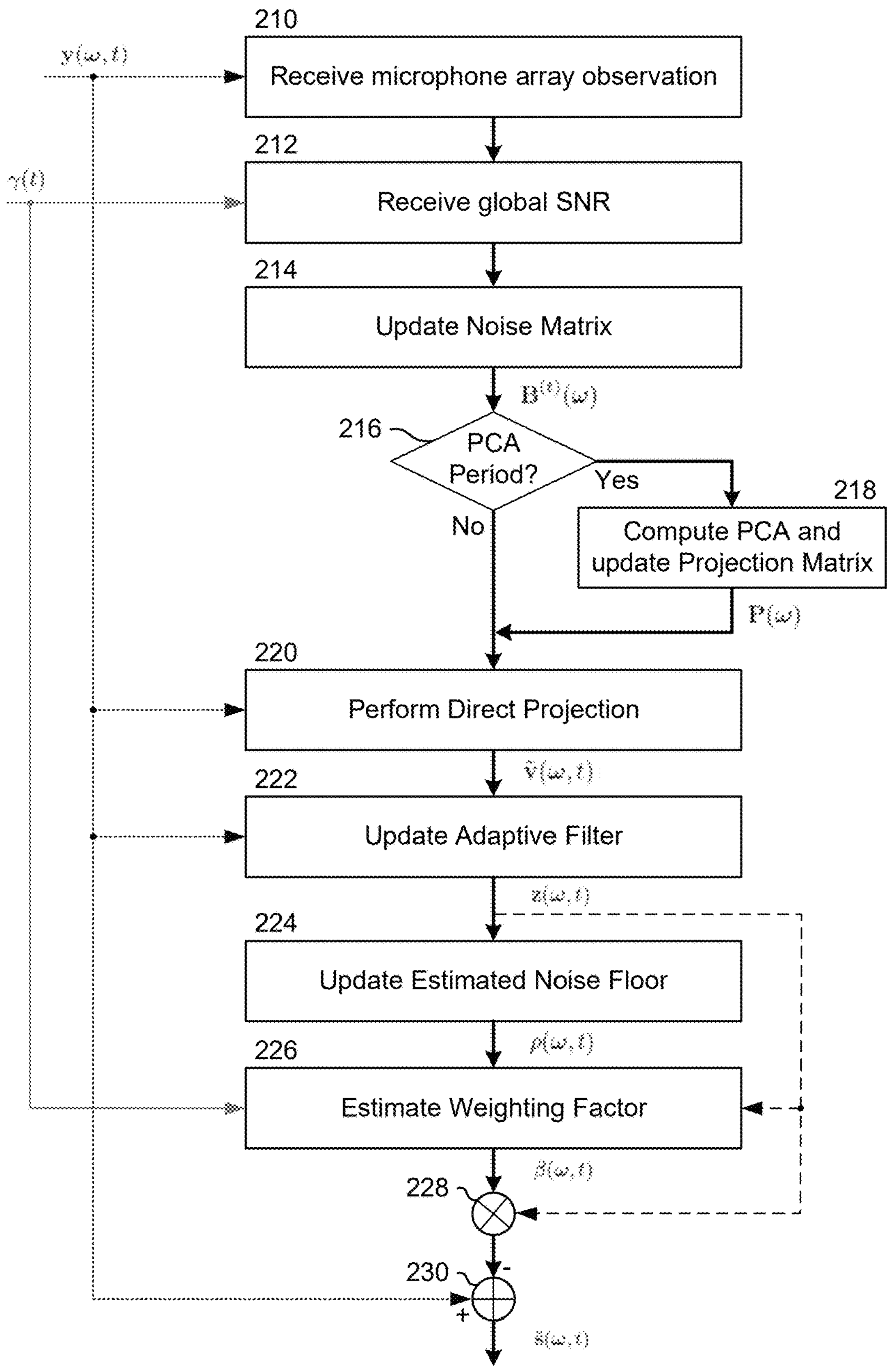
FIG. 2 is a flowchart conceptually illustrating an example method for performing noise suppression using subspace processing according to embodiments of the present disclosure.

FIG. 2 is a flowchart conceptually illustrating an example method for performing noise suppression using subspace processing according to embodiments of the present disclosure. While FIG. 3 illustrates examples of equations 300 that the device 110 may use to perform noise suppression using subspace processing, these equations will be described with regard to the flowchart illustrated in FIG. 2.

As illustrated in FIG. 2, the device 110 may receive (210) a microphone array observation (e.g., the microphone audio data 125) and may receive (212) a global signal-to-noise ratio (SNR) value, although the disclosure is not limited thereto. In some examples, the device 110 may generate the microphone audio data 125 and determine the global SNR value using the microphone audio data 125. However, the disclosure is not limited thereto, and in other examples the device 110 may generate SNR data representing a plurality of frequency-specific SNR values and/or other signal quality metric values without departing from the disclosure.

The microphone audio data 125 may be time-domain audio data or frequency-domain audio data without departing from the disclosure. For example, time-domain audio data may represent an amplitude of audio over time, whereas frequency-domain audio data may represent an amplitude of audio over frequency. If the microphone audio data 125 is in the time-domain, the device 110 may convert from the time-domain to the frequency-domain prior to performing noise suppression processing. For example, the microphone audio data 125 may be represented using a multichannel additive noise model (e.g., multichannel microphone signal 310) for a band of frequencies ω having the form:

$$y(\omega,t)=s(\omega,t)+v(\omega,t) \qquad [1]$$

where γ(ω,t) is a multichannel microphone signal, s(ω,t) is the clean speech at the microphone array, and v(ω,t) is the multichannel observation noise. A vector length may be equal to a product of a number of microphones and a number of frequencies within the frequency band. Thus, the device 110 may process an extended vector corresponding to multiple microphones in the microphone array, although the disclosure is not limited thereto. For example, processing multiple microphone channels simultaneously using the extended vector helps preserve coherence between the microphone channels that is needed in subsequent processing (e.g., beamforming, SSL processing, etc.). While the example above refers to processing multiple microphone channels, the disclosure is not limited thereto and the same processing may be performed using an extended vector corresponding to multiple beamformed audio signals output by a beamformer without departing from the disclosure.

Over a period of time T, the noise observation matrix V(ω) at ω is:

$$V(\omega)=[\{v(\omega,t)\}_{t\in T}] \qquad [2]$$

The general idea of principal component analysis (PCA) is to approximate a target subspace (e.g., noise subspace while performing noise suppression) by the column-space G of the dominant singular vectors that correspond to the largest singular values. The device 110 may perform noise suppression by projecting the input noisy observations onto the null space of noise $G^{\perp}$. This approximation works well under the following conditions:

1. The noise subspace does not change between estimation and suppression phases.
2. The singular values decay quickly.
3. The intersection between noise and speech subspaces is small.

In order to perform noise suppression using PCA, the device 110 may exclude speech vectors during the estimation of the noise subspace. For example, most heuristics are directed towards this goal. The noise subspace described above combines both noise spectrum and noise directions because the observations for all microphones are augmented in the observation vector. Thus, projecting onto the noise null space can be regarded as a beamformer with a null towards a noise direction with coherence matrix from multichannel noise spectrum.

During non-speech activity, the device 110 may approximate a noise subspace at each band of frequencies ω by the column space of the dominant singular vectors of V(ω) in Equation [2]. The singular vectors of V(ω) are the eigenvectors of:

$$B(\omega)\triangleq V(\omega)V'(\omega) \qquad [3]$$

$$\sum_{t\in T} v(\omega,t)\cdot v'(\omega,t)$$

To account for the possible presence of speech at time-frequency cell (ω, t), a scaling factor η(ω,t) is introduced that is inversely proportional to speech presence probability. For example, a noise matrix B(ω) may be computed as:

$$B(\omega)=\Sigma_{t\in T}\eta(\omega,t)v(\omega,t)\cdot v''(\omega,t) \qquad [4]$$

The choice of the scaling factor η(ω,t) is important to the overall performance of the noise suppression. In some examples, the scaling factor η(ω,t) (e.g., scaling factor 315) may be computed as a sigmoid function of the global signal-to-noise ratio (SNR) γ(t) at frame t:

$$\eta(\omega,t)=\frac{\eta_0}{1+\exp(\delta(\gamma(t)-\gamma_0))} \qquad [5]$$

where δ>0, $\eta_o \le 1$, and $\gamma_o$ are hyper-parameters that are tuned with data. Note that the weighting function in Equation [5] is not dependent on the frequency ω. In some examples, the device 110 may implement a global SNR as the global SNR may be more reliable. However, the disclosure is not limited thereto and in other examples the device 110 may implement a frequency-dependent SNR without departing from the disclosure.

As illustrated in FIG. 2, the device 110 may update (214) the noise matrix B(ω). For example, instead of calculating the full sum at each frame, as illustrated in Equation [4], the device 110 may update the noise matrix B(ω) (e.g., noise matrix 320) sequentially:

$$B^{(t)}(\omega)=v\,B^{(t-1)}(\omega)+\eta(\omega,t)v(\omega,t)\cdot v'(\omega,t) \qquad [6]$$

where v≤1 is a forgetting factor. In some examples, the covariance update in Equation [6] may be run at each time frame. However, as the noise subspace varies slowly, the device 110 may perform the computation of the eigenvectors of the noise matrix $B^{(t)}(\omega)$ to compute the noise subspace at a much slower rate (e.g., every 200 milliseconds) without departing from the disclosure.

The noise subspace at frequency ω is defined as the column space of the dominant eigenvectors of the noise matrix B(ω) in Equation [4], or the sequential implementation of the noise matrix $B^{(t)}(\omega)$ in Equation [6]. In these examples, the noise matrix B(ω) is a positive semi-definite matrix, and all its eigenvalues are real and non-negative. The eigenvalue decomposition of the noise matrix B(ω) can be written as:

$$B(\omega) = (u_1(\omega)u_2(\omega) \ldots u_n(\omega)) \begin{pmatrix} \sigma_1(\omega) & 0 & \cdots & 0 \\ 0 & \sigma_2(\omega) & & \\ \vdots & & \ddots & \\ 0 & & & \sigma_n(\omega) \end{pmatrix} \quad [7]$$

where $\sigma_1 \geq \sigma_2 \ldots \geq \sigma_n \geq 0$. The size of the noise subspace is determined by the decay of the singular values, along with a target noise suppression. For example, if the target noise suppression is δ, then the noise subspace (e.g., first vector data) is the column space of the first m(<n) eigenvectors, where:

$$\sum_{l=m+1}^{n} \sigma_l < (1-\delta) \sum_{l=1}^{n} \sigma_l \quad [8]$$

To illustrate an example, for 20 dB noise suppression corresponds to δ=0.01. Thus, if noise and speech are uncorrelated, then the speech distortion is approximately m/n. For example, if m=n/2, then performing PCA noise suppression introduces approximately 3 dB distortion to speech. To limit this distortion, the maximum number of eigenvectors (e.g., m) included in the first vector data is limited based on the target distortion.

As illustrated in FIG. 2, the device 110 may determine (216) whether a PCA period is complete and if so, may compute (218) the PCA and update a projection matrix. For example, the projection matrix P(ω) (e.g., projection matrix 325) may have the form:

$$P(\omega) = (u_1(\omega)u_2(\omega) \ldots u_m(\omega))(u_1(\omega)u_2(\omega) \ldots u_m(\omega))' \quad [9]$$

After updating the projection matrix P(ω) in step 218, or if the device 110 determines that the PCA period is not complete in step 216, the device 110 may perform (220) direct projection to generate a noise estimate. For example, the device 110 may approximate the noise component v(ω, t) of the observation y(ω, t) as:

$$\begin{aligned} \tilde{v}(\omega, t) &= P(\omega) y(\omega, t) \\ &= \sum_{l=1}^{m} \langle u_l(\omega), y(\omega, t) \rangle u_l(\omega) \end{aligned} \quad [10]$$

where ṽ(ω, t) is the noise estimate 330 approximated using the noise subspace associated with the first m eigenvectors determined above (e.g., first vector data). Thus, the device 110 may determine the noise estimate ṽ(ω, t) using direct projection (e.g., a direct projection method), although the disclosure is not limited thereto.

In some examples, the device 110 may subtract the noise estimate ṽ(ω, t) from the noisy observation y(ω, t) to generate the enhanced output s̃(ω, t) (e.g., enhanced speech signal). For example, the noise estimate ṽ(ω, t) may be a simple approximation of the noise component that enables the device 110 to perform noise suppression without additional processing. However, the disclosure is not limited thereto and in other examples the device 110 may use the noise estimate v(ω, t) to generate a weighted noise estimate z(ω, t) without departing from the disclosure. For example, the device 110 may generate the weighted noise estimate z(ω, t) by processing the noise estimate ṽ(ω, t) over time using an adaptive filter, which may be updated using normalized least-mean-square (NLMS) processing and/or the like. As illustrated in FIG. 2, the device 110 may update (222) the adaptive filter as described in greater detail below with regard to Equations [14]-[15], although the disclosure is not limited thereto. In this example, the device 110 may generate the enhanced output s̃(ω, t) (e.g., enhanced speech signal) by subtracting the weighted noise estimate z(ω, t) from the noisy observation y(ω, t) instead of the noise estimate ṽ(ω, t).

While the examples described above refer to the device 110 generating the enhanced output s̃(ω, t) using the noise estimate ṽ(ω, t) and/or the weighted noise estimate z(ω, t), the disclosure is not limited thereto. Additionally or alternatively, the device 110 may scale the noise estimate ṽ(ω, t) and/or the weighted noise estimate z(ω, t) to reduce signal distortion associated with the enhanced output s̃(ω, t). For example, the device 110 may generate a weighting factor β(ω, t) (e.g., noise estimate scaling) and may generate the enhanced output s̃(ω, t) using the weighting factor β(ω, t) without departing from the disclosure.

Performing noise suppression involves a compromise between noise reduction and signal distortion. At low SNR, noise suppression enhancement outweighs degradation due to signal distortion and vice versa. Thus, an intuitive trade-off is for the device 110 to apply noise suppression aggressively at low SNR (e.g., low signal quality metric values), while gradually reducing an amount of noise suppression as SNR increases (e.g., high signal quality metric values).

In some examples, the device 110 may implement this trade-off by scaling the noise estimate ṽ(ω, t) prior to subtraction from the noisy observation y(ω, t). Thus, the device 110 may determine the enhanced speech signal (e.g., enhanced output) as:

$$\tilde{s}(\omega, t) = y(\omega, t) - \beta(\omega, t)\tilde{v}(\omega, t) \quad [11]$$

where β(ω, t)≤1 is a weighting factor that is inversely proportional to SNR. For example, the device 110 may calculate the weighting factor β(ω, t) based on both the global SNR and the local SNR at each frequency ω. As illustrated in FIG. 2, the device 110 may update (224) an estimated noise floor. For example, the device 110 may smooth the estimated noise over time to determine an estimated noise floor ρ(ω, t) (e.g., estimated noise floor 340) at each frequency, which is computed as:

$$\rho(\omega, t) = \tau\rho(\omega, t-1) + (1-\tau)\tilde{v}(\omega, t) \quad [12]$$

Using the estimated noise floor ρ(ω, t), the device 110 may estimate (226) the weighting factor β(ω, t) (e.g., output gain). To reduce signal distortion, in some examples the device 110 may not allow the scaled noise to be bigger than the corresponding estimated noise floor ρ(ω, t). For example, if the allowed tolerance from the noise floor is λ≥1, then the weighting factor β(ω, t) (e.g., weighting factor 345):

$$\beta(\omega, t) = \min\left( \frac{\beta_0}{1 + \exp(\tilde{\delta}(\gamma(t) - \overline{\gamma}))}, \lambda \frac{\|\rho(\omega, t-1)\|}{\|\tilde{v}(\omega, t)\|} \right) \quad [13]$$

where $\gamma(t)$ is the global SNR as in Equation [5], where the global SNR $\gamma(t)$ was used for weighting the input observation prior to PCA computation. The first component in the minimum function of Equation [13] accounts for the global SNR scaling, while the second component in the minimum function accounts for maximum scaling from the estimated noise floor $\rho(\omega, t)$ at frequency $\omega$ such that the output estimate does not exceed $\lambda\|\rho(\omega, t-1)\|$.

As described above, the direct projection method used in Equation [10] is a simple approximation of the noise component. For example, the direct projection method is memoryless and does not exploit possible temporal correlation of the noise component. To improve temporal correlation, in some examples the device 110 may weight the estimated noise components $\{\tilde{v}(\omega, t)\}t$ using a single-channel adaptive filter (e.g., at each frequency $\omega$ and microphone). For example, the device 110 may generate the weighted noise estimate $z(\omega, t)$ by processing the noise estimate $\tilde{v}(\omega, t)$ over time using this adaptive filter, which may be updated using normalized least-mean-square (NLMS) processing and/or the like.

In some examples, the device 110 may determine the weighted noise estimate $z(\omega, t)$ (e.g., weighted noise estimate 335) as:

$$z(\omega, t) = \sum\nolimits_{l=0}^{T} \tilde{v}(\omega, t-l) \odot h^{*}(\omega, l) \quad [14]$$

where $\odot$ denotes point-wise multiplication, and $h(\omega,l)$ is a complex-valued vector having the same size as the noise estimate $v(\omega, t)$ and representing the single-channel adaptive filter weight at lag l. The device 110 may update the filter weights $h(\omega,l)$ with standard NLMS processing, where the error is computed as:

$$e(\omega,t)=y(\omega,t)-z(\omega,t) \quad [15]$$

and the step-size is reduced at high-SNR (e.g., high signal quality metric values), which the device 110 may use as a proxy for double-talk conditions.

In this example, the device 110 may generate the enhanced output $\tilde{s}(\omega, t)$ by subtracting the weighted noise estimate $z(\omega, t)$ from the noisy observation $y(\omega, t)$ instead of the noise estimate $\tilde{v}(\omega, t)$. As illustrated in FIG. 2, the device 110 may determine (228) a scaled noise estimate by multiplying the weighting factor $\beta(\omega, t)$ and the weighted noise estimate $z(\omega, t)$ and may determine (230) the enhanced output $\tilde{s}(\omega, t)$ by subtracting the scaled noise estimate from the multichannel microphone signal $y(\omega,t)$ (e.g., microphone audio data 125). For example, the device 110 may determine the enhanced output $\tilde{s}(\omega, t)$ (e.g., enhanced signal 350) using:

$$\tilde{s}(\omega,t)=y(\omega,t)-\beta(\omega,t)z(\omega,t) \quad [16]$$

Referring back to FIG. 2, the device 110 may perform steps 210-230 in order to perform PCA noise suppression processing for a single band of frequencies $\omega$ at a given time frame. The PCA update period is typically much larger than the frame period (e.g., every 200 milliseconds, although the disclosure is not limited thereto). While FIG. 2 illustrates the adaptive filter in step 222 and performing noise estimate scaling in steps 224-226, these steps are optional and the disclosure is not limited thereto. Thus, the device 110 may generate the enhanced output $\tilde{s}(\omega, t)$ using step 222, steps 224-226, steps 222-226, and/or any combination thereof without departing from the disclosure.

As described above, the device 110 may use SNR and/or other signal quality metrics as a proxy for speech detection, where detection probability is proportional to SNR (e.g., signal quality metrics). However, as the device 110 may determine the SNR from the signal energy at each time frame, the SNR metric may limit an overall performance of the noise suppression because it can only track stationary noise.

To further improve the overall performance, in some examples the device 110 may implement a voice activity detector (VAD) component to enhance the estimation of the noise matrix $B(\omega)$. For example, the device 110 may only update the noise matrix $B(\omega)$ in the absence of speech as determined by the VAD component. Thus, the VAD component may enable the device 110 to accommodate high-energy noise bursts and should significantly improve overall performance for non-stationary noise.

Figure 4:
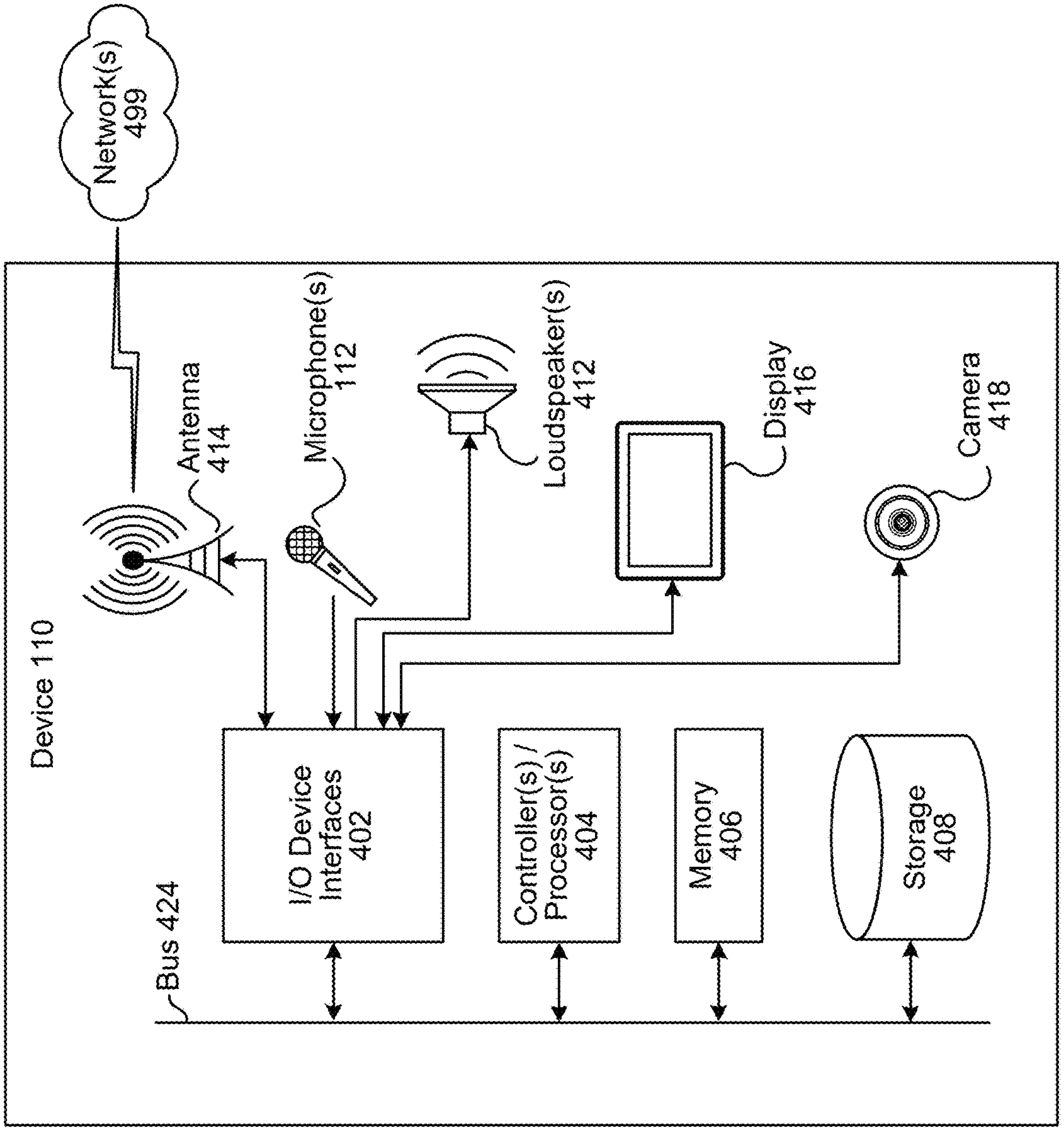
FIG. 4 is a block diagram conceptually illustrating example components of a system for performing noise suppression according to embodiments of the present disclosure.

FIG. 4 is a block diagram conceptually illustrating a device 110 that may be used with the system. In operation, the system 100 may include computer-readable and computer-executable instructions that reside on the device 110, as will be discussed further below.

The device 110 may include one or more audio capture device(s), such as microphones 112 or an array of microphones. The audio capture device(s) may be integrated into the device 110 or may be separate. The device 110 may also include an audio output device for producing sound, such as loudspeaker(s) 412. The audio output device may be integrated into the device 110 or may be separate. In some examples the device 110 may include a display 416, but the disclosure is not limited thereto and the device 110 may not include a display or may be connected to an external device/display without departing from the disclosure.

The device 110 may include one or more controllers/processors (404), which may each include a central processing unit (CPU) for processing data and computer-readable instructions, and a memory (406) for storing data and instructions of the respective device. The memories (406) may individually include volatile random access memory (RAM), non-volatile read only memory (ROM), non-volatile magnetoresistive memory (MRAM), and/or other types of memory. The device 110 may also include a data storage component (408) for storing data and controller/processor-executable instructions. Each data storage component (408) may individually include one or more non-volatile storage types such as magnetic storage, optical storage, solid-state storage, etc. The device 110 may also be connected to removable or external non-volatile memory and/or storage (such as a removable memory card, memory key drive, networked storage, etc.) through respective input/output device interfaces (402).

Computer instructions for operating the device 110 and its various components may be executed by the respective device's controller(s)/processor(s) (404), using the memory (406) as temporary "working" storage at runtime. A device's computer instructions may be stored in a non-transitory manner in non-volatile memory (406), data storage component (408), or an external device(s). Alternatively, some or all of the executable instructions may be embedded in hardware or firmware on the respective device in addition to or instead of software.

The device 110 includes input/output device interfaces (402). A variety of components may be connected through the input/output device interfaces (402), such as the microphones 112, the loudspeaker(s) 412, and/or the display 416. The input/output interfaces (402) may include A/D converters for converting the output of the microphones 112 into microphone audio data, if the microphones 112 are integrated with or hardwired directly to the device 110. If the microphones 112 are independent, the A/D converters will be included with the microphones 112, and may be clocked independent of the clocking of the device 110. Likewise, the input/output interfaces 1102 may include D/A converters for converting output audio data into an analog current to drive the loudspeaker(s) 412, if the loudspeaker(s) 412 are integrated with or hardwired to the device 110. However, if the loudspeaker(s) 412 are independent, the D/A converters will be included with the loudspeaker(s) 412 and may be clocked independent of the clocking of the device 110 (e.g., conventional Bluetooth loudspeakers).

Additionally, the device 110 may include an address/data bus (424) for conveying data among components of the respective device. Each component within a device 110 may also be directly connected to other components in addition to (or instead of) being connected to other components across the bus (424).

Referring to FIG. 4, the device 110 may include input/output device interfaces 402 that connect to a variety of components such as an audio output component such as loudspeaker(s) 412, a wired headset or a wireless headset (not illustrated), or other component capable of outputting audio. The device 110 may also include an audio capture component. The audio capture component may be, for example, microphones 112 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 416 for displaying content and/or a camera 418 to capture image data, although the disclosure is not limited thereto. The input/output device interfaces (402) may also include an interface for an external peripheral device connection such as universal serial bus (USB), FireWire, Thunderbolt or other connection protocol.

The device 110 may connect to one or more network(s) 499 through either wired and/or wireless connections. For example, the device 110 may connect to the network(s) 499 via an Ethernet port, through a wireless service provider (e.g., using a WiFi or cellular network connection), over a wireless local area network (WLAN) (e.g., using WiFi or the like), over a wired connection such as a local area network (LAN), and/or the like. The network(s) 499 may include a local or private network or may include a wide network such as the Internet.

As illustrated in FIG. 4, the input/output device interfaces 402 may connect to the network(s) 499 via antenna(s) 414. For example, the device 110 may connect to the network(s) 499 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 499, the system may be distributed across a networked environment. The I/O device interface (402) may also include communication components that allow data to be exchanged between devices such as different physical servers in a collection of servers or other components.

The components of the device 110 may include their own dedicated processors, memory, and/or storage. Alternatively, one or more of the components of the device 110 may utilize the I/O interfaces (402), processor(s) (404), memory (406), and/or data storage component (408) of the device 110, respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, as described herein, are illustrative, and may be located as a stand-alone device or may be included, in whole or in part, as a component of a larger device or system.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented in different forms of software, firmware, and/or hardware, such as an acoustic front end (AFE), which comprises, among other things, analog and/or digital filters (e.g., filters configured as firmware to a digital signal processor (DSP)). Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:

determining first audio data including a first representation of an audible sound and a first representation of noise, the first audio data corresponding to a plurality of microphones;

determining, using the first audio data, first signal quality metric data;

determining, using the first signal quality metric data, first data;

determining, using the first audio data and the first data, second data corresponding to the noise, the second data comprising a plurality of components;

determining, using the second data, first vector data representing a subset of the plurality of components, the first vector data corresponding to the plurality of microphones;

determining, using the first vector data and the first audio data, second audio data including a second representation of the noise;

determining, using the first audio data and the second audio data, third audio data including a second representation of the audible sound, determining, using the second audio data, estimated noise floor data; and determining third data using the first signal quality metric data, the second audio data, and the estimated noise floor data, the third data corresponding to a target amount of noise suppression.

2. The computer-implemented method of claim 1, wherein determining the second audio data further comprises:

determining, using the first vector data and the first audio data, fourth audio data including a third representation of the noise; and determining, using the fourth audio data and first weight values associated with an adaptive filter, the second audio data, wherein the method further comprises:

determining, using the second audio data and the third audio data, second weight values associated with the adaptive filter.

3. The computer-implemented method of claim 1, wherein determining the third audio data further comprises:

generating, using the second audio data and the third data, fourth audio data including a third representation of the noise; and determining the third audio data using the first audio data and the fourth audio data.

4. The computer-implemented method of claim 1, wherein determining the first data further comprises:

determining, using the first signal quality metric data, a first value associated with a first frequency range and a second value associated with a second frequency range;

determining, using the first value, a first weight value, wherein the first weight value corresponds to the first frequency range; and determining, using the second value, a second weight value, wherein the second weight value corresponds to the second frequency range.

5. The computer-implemented method of claim 1, wherein the plurality of components comprise a plurality of eigenvectors, and determining the first vector data further comprises:

selecting a first eigenvector from the plurality of eigenvectors, the first eigenvector having a highest value of the plurality of eigenvectors;

selecting a second eigenvector from the plurality of eigenvectors, the second eigenvector having a second highest value of the plurality of eigenvectors; and determining the first vector data, wherein the first vector data includes the first eigenvector and the second eigenvector.

6. The computer-implemented method of claim 1, wherein the plurality of components comprise a plurality of eigenvectors, and determining the first vector data further comprises:

determining a first value corresponding to the target amount of noise suppression;

determining, using the first value, a first number of eigenvectors from the plurality of eigenvectors; and determining, using the plurality of eigenvectors, the first vector data, wherein the first vector data includes the first number of eigenvectors.

7. The computer-implemented method of claim 1, wherein determining the second data further comprises:

determining, using a first weight value and a first portion of the first audio data, a first value, wherein the first value is associated with a first frequency range and a first time range;

determining, using the first weight value and a second portion of the first audio data, a second value, wherein the second value corresponds to a second time range after the first time range; and determining, using the first value and the second value, a third value associated with the first frequency range and the second time range.

8. The computer-implemented method of claim 1, wherein determining the second audio data further comprises:

determining, using the first vector data and the first audio data, fourth audio data including a third representation of the noise;

determining, using a portion of the fourth audio data associated with a first frequency range, an estimated noise floor value, wherein the estimated noise floor value corresponds to the first frequency range;

determining, using the first signal quality metric data, a first attenuation value; and determining, using the portion of the fourth audio data and the estimated noise floor value, a second attenuation value, wherein a portion of the second audio data is determined using the portion of the fourth audio data and one of the first attenuation value or the second attenuation value.

9. The computer-implemented method of claim 1, wherein determining the second data further comprises:

determining that speech is not detected in a first portion of the first audio data, wherein the first portion of the first audio data corresponds to a first time range;

determining, using the first data and the first portion of the first audio data, a first value;

associating a first portion of the second data with the first value, wherein the first portion of the second data corresponds to the first time range;

determining that speech is detected in a second portion of the first audio data, wherein the second portion of the first audio data corresponds to a second time range; and associating a second portion of the second data with the first value, wherein the second portion of the second data corresponds to the second time range.

10. A system comprising:

at least one processor; and memory including instructions operable to be executed by the at least one processor to cause the system to:

determine first audio data including a first representation of an audible sound and a first representation of noise, the first audio data corresponding to a plurality of microphones;

determine, using the first audio data, first signal quality metric data;

determine, using the first signal quality metric data, first data;

determine, using the first audio data and the first data, second data corresponding to the noise, the second data comprising a plurality of components;

determine, using the second data, first vector data representing a subset of the plurality of components, the first vector data corresponding to the plurality of microphones;

determine, using the first vector data and the first audio data, second audio data including a second representation of the noise;

determine, using the second audio data and first weight values associated with an adaptive filter, third audio data including a third representation of the noise;

determine, using the first audio data and the third audio data, fourth audio data including a second representation of the audible sound; and determine, using the third audio data and the fourth audio data, second weight values associated with the adaptive filter.

11. The system of claim 10, wherein the memory further comprises instructions that, when executed by the at least one processor, further cause the system to:

determine, using the third audio data, estimated noise floor data; and determine third data using the first signal quality metric data, the third audio data, and the estimated noise floor data, the third data corresponding to a target amount of noise suppression.

12. The system of claim 11, wherein the memory further comprises instructions that, when executed by the at least one processor, further cause the system to:

generate, using the third audio data and the third data, fifth audio data including a fourth representation of the noise; and determine the fourth audio data using the first audio data and the fifth audio data.

13. The system of claim 10, wherein the memory further comprises instructions that, when executed by the at least one processor, further cause the system to:

determine, using the first signal quality metric data, a first value associated with a first frequency range and a second value associated with a second frequency range;

determine, using the first value, a first weight value, wherein the first weight value corresponds to the first frequency range; and determine, using the second value, a second weight value, wherein the second weight value corresponds to the second frequency range.

14. The system of claim 10, wherein the plurality of components comprise a plurality of eigenvectors, and the memory further comprises instructions that, when executed by the at least one processor, further cause the system to:

select a first eigenvector from the plurality of eigenvectors, the first eigenvector having a highest value of the plurality of eigenvectors;

select a second eigenvector from the plurality of eigenvectors, the second eigenvector having a second highest value of the plurality of eigenvectors; and determine the first vector data, wherein the first vector data includes the first eigenvector and the second eigenvector.

15. The system of claim 10, wherein the plurality of components comprise a plurality of eigenvectors, and the memory further comprises instructions that, when executed by the at least one processor, further cause the system to:

determine a first value corresponding to a target amount of noise suppression;

determine, using the first value, a first number of eigenvectors from the plurality of eigenvectors; and determine, using the plurality of eigenvectors, the first vector data, wherein the first vector data includes the first number of eigenvectors.

16. The system of claim 10, wherein the memory further comprises instructions that, when executed by the at least one processor, further cause the system to:

determine, using a first weight value and a first portion of the first audio data, a first value, wherein the first value is associated with a first frequency range and a first time range;

determine, using the first weight value and a second portion of the first audio data, a second value, wherein the second value corresponds to a second time range after the first time range; and determine, using the first value and the second value, a third value associated with the first frequency range and the second time range.

17. The system of claim 10, wherein the memory further comprises instructions that, when executed by the at least one processor, further cause the system to:

determine, using a portion of the second audio data associated with a first frequency range, an estimated noise floor value, wherein the estimated noise floor value corresponds to the first frequency range;

determine, using the first signal quality metric data, a first attenuation value; and determine, using the portion of the second audio data and the estimated noise floor value, a second attenuation value, wherein a portion of the third audio data is determined using the portion of the second audio data and one of the first attenuation value or the second attenuation value.

18. The system of claim 10, wherein the memory further comprises instructions that, when executed by the at least one processor, further cause the system to:

determine that speech is not detected in a first portion of the first audio data, wherein the first portion of the first audio data corresponds to a first time range;

determine, using the first data and the first portion of the first audio data, a first value;

associate a first portion of the second data with the first value, wherein the first portion of the second data corresponds to the first time range;

determine that speech is detected in a second portion of the first audio data, wherein the second portion of the first audio data corresponds to a second time range; and associate a second portion of the second data with the first value, wherein the second portion of the second data corresponds to the second time range.

19. A computer-implemented method, the method comprising:

determining first audio data including a first representation of an audible sound and a first representation of noise, the first audio data corresponding to a plurality of microphones;

determining, using the first audio data, first signal quality metric data;

determining, using the first signal quality metric data, first data;

determining, using the first audio data and the first data, second data corresponding to the noise and comprising a plurality of components, wherein determining the second data further comprises:

determining, using a first weight value and a first portion of the first audio data, a first value, wherein the first value is associated with a first frequency range and a first time range, determining, using the first weight value and a second portion of the first audio data, a second value, wherein the second value corresponds to a second time range after the first time range, and determining, using the first value and the second value, a third value associated with the first frequency range and the second time range;

determining, using the second data, first vector data representing a subset of the plurality of components, the first vector data corresponding to the plurality of microphones;

determining, using the first vector data and the first audio data, second audio data including a second representation of the noise; and determining, using the first audio data and the second audio data, third audio data including a second representation of the audible sound.

* * * * *